United States Patent [19] [11] 4,052,196
Namy et al. [45] Oct. 4, 1977

[54] METHOD AND APPARATUS OF MOISTENING CHARGE MATERIAL FOR AN ORE-DRESSING PLANT

[76] Inventors: Gerald Namy, 13, Cours Fauriel, Saint Etienne (Lorie), France; August Becker, Stummstrasse 33; Klaus Trappe, Merzigerstrasse 83, both of Dillingen, Germany

[21] Appl. No.: 6,193

[22] Filed: Jan. 27, 1970

[51] Int. Cl.$^2$ .......................... C21B 3/04; B01F 15/02
[52] U.S. Cl. .......................................... 75/25; 75/24; 366/150
[58] Field of Search .................. 75/1, 3, 25, 24, 2, 75/5, 53, 60, 101, 103; 259/11

[56] References Cited

U.S. PATENT DOCUMENTS

| | | | |
|---|---|---|---|
| 1,940,912 | 12/1933 | Isbell | 75/1 |
| 2,348,360 | 5/1944 | Reed | 75/2 |
| 2,373,244 | 4/1945 | Holz | 75/25 |
| 2,790,712 | 4/1957 | Henrichs | 75/60 |
| 2,842,434 | 7/1958 | Kippe | 75/53 |
| 2,888,320 | 5/1959 | McCord | 75/103 |
| 3,185,563 | 5/1965 | Jones | 75/3 |
| 3,188,201 | 6/1965 | Sontheimer | 75/25 |
| 3,205,064 | 9/1965 | Chang | 75/3 |
| 3,330,649 | 7/1967 | Welsh | 75/101 |
| 3,495,973 | 2/1970 | Ban | 75/5 |

OTHER PUBLICATIONS

F. M. Wilkinson, "Wet Washing of BOF Gases–Lackawanna," Iron and Steel Engineer, pp. 142–146 (Sept. 1967).

*Primary Examiner*—P. D. Rosenberg

[57] ABSTRACT

A method and apparatus for moistening the charge material of an ore-dressing plant with an iron oxide containing dust-water dispersion comprising the thickening of the dispersion into a mud, a pumping of the mud from the thickener to a mixing device where the mud is mixed with the charge material, and controlling the amount of mud dependent upon the water requirements of the ore-dressing plant by varying the amount of mud conveyed. In case of a mud blockage of the system, means are provided for flushing the system out with rinsing water.

10 Claims, 1 Drawing Figure

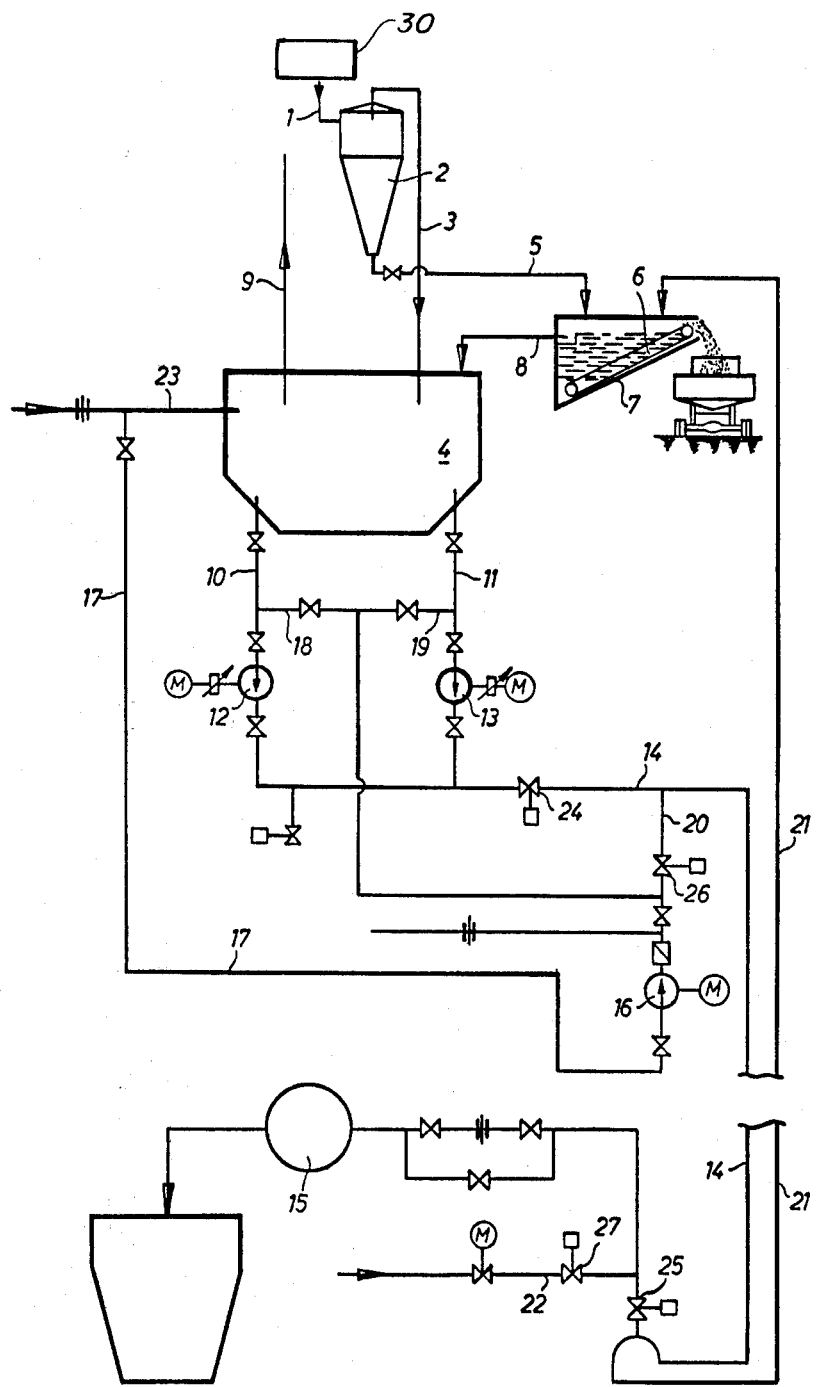

METHOD AND APPARATUS OF MOISTENING CHARGE MATERIAL FOR AN ORE-DRESSING PLANT

The invention relates to the method and apparatus of utilizing a water-dust dispersion obtained from waste gases and particularly in the case of spray precipitation of waste gases having iron oxide containing dusts. Such waste gases can be the by-product of oxygen-blowing (blast) processes.

The waste gases developed in the steel industry when using oxygen blowing or blasting have a high content of iron oxide. If these gases are purified by means of spray precipitation, the result will be the production of a large quantity of dirty water containing the precipitated dust in dispersion, hereinafter called water-dust dispersion. This dirty water cannot be pumped per se into streams because of pollution. Therefore, it is customary to thicken the dirty water in a thickener and then to dry it further in the vacuum so that it has a moisture content of 30 – 50%. The product made in such a way is either dried immediately by further drying processes, or it is dried after pelletization, or it is kneaded in a kneading worm with a water-binding agent such as lime. Only the pelletized dried material is used again, usually as an addition to the burden of a steel producing furnace. The purified water is conducted back to the spray precipitation installation.

An object of the present invention is to further treat iron oxide which has been captured by spray precipitation with less expenditure than the traditional methods, and to use it again. According to the invention a water-dust dispersion obtained by spray precipitation of waste gases with iron oxide containing dusts, especially waste gases obtained from the oxygen blowing and blasting in the steel industry, is used for moistening the charge material in ore-dressing installations, for example in sintering or pelletizing installations. This means a considerable saving, since all the above-mentioned drying processes are avoided and, moreover, the conveyance of the water-dust dispersion can be accomplished in the simplest manner through pipe lines, while the dry cakes produced heretofore require a considerably more cumbersome conveyancing mechanism.

The water-dust dispersion can be thickened in accordance with the water requirements of the charge material of the ore-dressing installations.

The apparatus for carrying out the above method contains, inter alia, means arranged in a pipe line leading from a thickener to a mixing device for the charge material, which means controls the conveying capacity of the water-dust disperion in accordance with the water requirements of the charge material.

In order to be able to relieve any obstructions in the conveying pipe of the water-dust dispersion as easily as possible, preferably at least one pipe for rinsing water meets the conveying pipe leading from the thickener to the mixing device for the charge material at a place which is either located close to the thickener and/or the mixing device and which can be closed with regard to the thickener and mixing device. There may be a discharge pipe for the rinsing water branching off from the conveying pipe at a point which is located close to the mixing device or the thickener and which can be closed in relation to said device or said thickener. The delivery pipe may lead back directly or indirectly into the thickener.

The invention will be better understood by describing the invention as seen in the attached drawing which shows in diagrammatic form a preferred embodiment.

Pipe 1, from a spray precipitation installation 30, leads to a hydrocyclone 2, whose exit for the liquid is connected by way of a pipe 3 with a thickener 4, and whose opening for solid matter is connected by way of a pipe 5 with a tank 6, on the slanting bottom of which a catenary remover has been disposed. An overflow pipe 8 leads from the tank 6 to the thickener 4, and from the thickener 4 a return pipe 9 to the spray precipitation. Two mud lines 10 and 12 lead out of the lower part of the thickener 4, into which lines of mud pump 12 and 13, respectively, have been inserted. The two mud lines are united to a mud line 14 which leads to a mixing drum 15 for the ore that is to be sintered, for example. Pipe 17 for the rinsing water, provided with a pump 16, leads in three branches 18, 19 and 20 to the mud lines 10, 11 and 14, respectively. From the end of the mud line 14 on the mixing drum, a discharge pipe 21 for the rinsing water goes to the tank 6. Furthermore, a pipe 22 for nondrinkable water for industrial purposes leads to the mud line 14, and an additional water pipe 23 leads to the thickener 4. Finally, all necessary sections of the pipes described can be closed automatically or manually by way of means such as rotating or sliding valves, indicated in the drawing by numerals 24, 25, 26 and 27. Manometers are designated by M. In an example of the operation of the installation, dirty water operating as follows, is obtained during the spray precipitation of the waste gases of two 150 ton blown converters. The dusts contained in the dirty water have a composition of about 50 – 60% $Fe_2O_3$, 30 – 40% FeO, 1% $SiO_2$, 3 – 5% CaO and up to 2% $P_2O_5$. The throughput quantity of ores of various origin in the sintering installation amounts to 200 – 250 t/hr. To this quantity are added about 500 – 1,000 tons of solid matter per month from the dirty water.

From the dirty water coming from the spray precipitation installation through the line 1, the larger granules of dust are separated in the hydrocyclone 2 which make up approximately 10 – 20% of the quantity of dust obtained. These larger granules will reach the tank 6 through the conduit 5, will settle there, and will be removed from the tank by the catenary remover 7. The overflow from the tank 6 flows through the overflow conduit 8 into the thickener 4. Furthermore, the dirty water, freed of its coarse granular constituent in the cyclone 2, flows through the conduit 3 into the thickener 4. There mud will settle from the dirty water while clear water flows via the overflow of the thickener and again reaches the spray precipitation installation 30 through the return conduit 9. In this fashion the water-dust dispersion is concentrated.

Through the mud pumps 12 and/or 13, sufficient mud will be drawn from the thickener 4 via the mud conduits 10 and 11 and pumped via the mud conduit 14 into the mixing drum 15 as will be required in the moistening of the charge material for the sintering installation.

For this purpose, the water requirement of the sintering plant will be continuously determined. If the actual quantity of water deviates from a predetermined theoretical value, the number of revolutions of the mud pumps will be varied via a variable speed reducer and, as a result, the quantity of mud drawn off the thickener is adapted to the exiting conditions. The conveying capacity of the pumps in the present example amounts to a maximum of 30 m³/h and the concentration of the mud varies depending on the operational conditions, an example is about 200 g/l. Thus, because of a correspondingly high requirement of the mixing drum 15 for mud water, the concentration of the mud can be smaller than in case of normal use of a thickener of this kind. This will be advantageous insofar as the conveyance of the mud will be easier as a result.

The quantity of water removed with the mud from the thickener 4 is replaced through the additional conduit 23 which keeps the liquid level in the thickener 4 constant. Furthermore, the water flowing through the additional water conduit 23 into the thickener replaces the losses through evaporation occurring in the spray precipitation installation.

The thickener 4 has been dimensioned large enough in order to be able to fulfill its task as a reservoir during standstill times of the sintering installation. Since, during these standstill times the flow in the mud conduits 10, 11 and 14 must be kept up so that no solid substances will be deposited therein, the mud pumps 12 and 13 continue to convey, in which case the mud entirely flows back through the rinsing water conduit 21 and valve 25 is closed. When valve 25 is opened, the pressure at the branching off point of the rinsing water conduit 21 is too small to overcome the difference in height between valve 25 and the end of the rinsing water conduit 21 at tank 6, therefore no return flow will take place in the discharge conduit for the rinsing water. If, on the other hand, the spray precipitation installation is at a standstill, then the charge material for the sintering plant is wetted down with nondrinkable water for industrial purposes, introduced through conduit 22.

If, as a result of obstruction of a conduit in the installation described a rise in pressure occurs, then one can relieve the system of conduits through rinsing, for example, in the following manner:

The mud pumps 12 or 13 are stopped, after which the valves 24 and 25 are closed and the valves 26 and 27 are opened. Subsequently, the pump 16 for the rinsing water is started and rinsing water is pumped into the mud conduit 14 via the branch 20 of the rinsing water conduit 17 and is conveyed back into the tank 6 through the discharge conduit 21 for the rinsing water. The rinsing process will last until the conduit system has been opened by rinsing. In this time, the mixing drum 15 is supplied with nondrinkable water for industrial purposes from the conduit 22, whereby the regulating device otherwise serving for the control of the mud pumps is reset automatically by a regulating valve located in this conduit. Moreover, via the branches 18 and 19, the possibility exists of opening up the mud conduits 10 and 11, as well as the mud pumps 12 or 13, through rinsing. After the rinsing process has been concluded, the pump 16 for the rinsing water is stopped. After that, the valves 26 and 27 are closed, the valves 24 and 25 are opened and the mud pumps 12 and 13 are put into operation again. The arrangement can also be made in such a manner that the rinsing process is started automatically whenever the pressure in the conduit 14 surpasses an adjustable maximum value.

What we claim is:

1. A method of precluding the disposal of dirty water generated in steel production into rivers and the like by using such dirty water to moisten charge material for an ore-dressing plant consisting of the steps of introducing the dirty water, which is an iron oxide containing dust-water dispersion obtained by spray-precipitation of the waste gases from an oxygen-blowing steel production plant, into a thickener; removing the dispersion from the thickener by at least one pump and conveying the dispersion through conduits directly to a mixing device; introducing charge material for the ore-dressing plant into the mixing device to mix the dispersion and charge material; controlling the amount of dispersion dependent upon the water requirements of the charge material for the ore-dressing plant, by altering the amount of dispersion conveyed in the conduits between the thickener and the mixing device; recycling a portion of the water in the thickener back to the spray precipitation apparatus; and introducing water into the thickener to maintain a desired level, the thickener acting as a reservoir for the solids of the dust-water dispersion.

2. A method as claimed in claim 1 wherein said controlling is carried out by altering the conveying capacity of the pump.

3. A method as claimed in claim 1 which further includes the steps when there is dispersion blockage of stopping the pump; introducing rinsing water in the conduits at points close to the container and mixing device to flush the system; and shunting the rinsing water introduced close to the container back thereto.

4. Apparatus for precluding the disposal of dirty water generated in steel production into rivers and the like by using such dirty water to moisten charge material for an ore-dressing plant consisting of means for introducing the dirty water, which is an iron oxide containing dust-water dispersion from a spray precipitation apparatus, to a thickener; a mixing device for mixing the dispersion and charge material for the ore-dressing plant; passage means between the thickener and mixing device for conveying the dispersion; at least one pump in the passage means for removing the dispersion from the thickener and introducing it to the mixing device; controlling means to determine the amount of dispersion conveyed between the thickener and the mixing device dependent upon the water requirements of the ore-dressing plant; further passage means to recycle a portion of the water from the thickener to the spray precipitation apparatus; and conduit means for introducing water into the thickener to maintain the desired level, the thickener acting as a reservoir for the solids of the dust water dispersion.

5. Apparatus as claimed in claim 4 wherein said controlling means alters the pumping capacity of the pump.

6. Apparatus as claimed in claim 4 further comprising two pumps each mounted in a passage and which passage combine into a single passage prior to the mixing device.

7. Apparatus as claimed in claim 4 further comprising rinsing water conduits connecting with the passage means at points near the thickener and the mixing device; valves in the conduits; and a discharge pipe connecting with the passage means intermediate the two conduit connections with the passage means so that when there is a dispersion blockage of the system, the pump can be stopped, further valves closed, said conduit valves opened, and rinsing water forced into the system to flush it.

8. Apparatus as claimed in claim 7 wherein said rinsing water is introduced at at least two points near the thickener and the so introduced rinsing water flows back to the thickener partly by way of the discharge pipe.

9. Apparatus as claimed in claim 4 wherein said ore-dressing plant is an ore sintering installation.

10. Apparatus as claimed in claim 4 wherein said ore-dressing plant is an ore pelletizing installation.

* * * * *